United States Patent
Erb et al.

(10) Patent No.: US 9,937,693 B2
(45) Date of Patent: Apr. 10, 2018

(54) ADHESIVE BOLT AND ATTACHMENT METHOD

(71) Applicant: Dr. Ing. h.c. F. Porsche Aktiengesellschaft, Stuttgart (DE)

(72) Inventors: Thiemo Erb, Stuttgart (DE); Markus Brunner, Sachsenheim (DE); Jens-Ole Thoebel, Ludwigsburg (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 518 days.

(21) Appl. No.: 14/565,523

(22) Filed: Dec. 10, 2014

(65) Prior Publication Data

US 2015/0158283 A1 Jun. 11, 2015

(30) Foreign Application Priority Data

Dec. 10, 2013 (DE) .................. 10 2013 113 763

(51) Int. Cl.
*F16B 39/02* (2006.01)
*B32B 37/14* (2006.01)
(Continued)

(52) U.S. Cl.
CPC ........ *B32B 37/142* (2013.01); *B32B 37/1292* (2013.01); *B32B 38/0004* (2013.01); *C09J 5/00* (2013.01); *C09J 5/02* (2013.01); *F16B 11/006* (2013.01); *F16B 37/048* (2013.01); *F16B 39/02* (2013.01); *B29C 65/483* (2013.01); *B29C 65/485* (2013.01); *B29C 65/4815* (2013.01); *B29C 65/4825* (2013.01); *B29C 65/561* (2013.01); *B29C 65/565* (2013.01); *B29C 66/02242* (2013.01); *B29C 66/02245* (2013.01); *B29C 66/1122* (2013.01); *B29C 66/131* (2013.01);
(Continued)

(58) Field of Classification Search
CPC ...... F16B 11/006; F16B 35/04; F16B 35/041; F16B 35/044; F16B 37/048; F16B 39/02; F16B 39/225
USPC .................. 411/82, 82.2, 82.3, 387.1, 387.6, 411/388–389, 424
See application file for complete search history.

(56) References Cited

U.S. PATENT DOCUMENTS 2,741,289 A * 4/1956 Grow .................... F16B 39/282
411/185
3,245,449 A * 4/1966 Mitchell ................ F16B 35/06
411/176
(Continued)

FOREIGN PATENT DOCUMENTS

| DE | 103 59 466 | 7/2005 |
|---|---|---|
| DE | 10 2004 062 391 | 7/2006 |
| WO | 2006/032954 | 3/2006 |

OTHER PUBLICATIONS

German Search Report dated Sep. 19, 2014.

*Primary Examiner* — Roberta S Delisle
(74) *Attorney, Agent, or Firm* — Gerald E. Hespos; Michael J. Porco; Matthew T. Hespos (57) ABSTRACT

An adhesive bolt for forming a fastening point to a workpiece has a head and a shank connected to the head. The shank is set up to be introduced into a cutout on the workpiece. An adhesive is situated in the region of the shank and the workpiece. The shank is configured to enter into a non-positive preliminary connection with a bounding face of the cutout until the adhesive has hardened.

13 Claims, 7 Drawing Sheets

(51) Int. Cl.
*B32B 37/12* (2006.01)
*B32B 38/00* (2006.01)
*C09J 5/00* (2006.01)
*C09J 5/02* (2006.01)
*F16B 11/00* (2006.01)
*F16B 37/04* (2006.01)
*B29L 31/00* (2006.01)
*B29C 65/48* (2006.01)
*B29C 65/56* (2006.01)
*B29C 65/00* (2006.01)
*B29L 31/30* (2006.01)

(52) U.S. Cl.
CPC .......... *B29C 66/21* (2013.01); *B29C 66/3032* (2013.01); *B29C 66/532* (2013.01); *B29C 66/7212* (2013.01); *B29C 66/742* (2013.01); *B29L 2031/30* (2013.01); *B29L 2031/737* (2013.01); *C09J 2203/102* (2013.01); *C09J 2205/11* (2013.01); *Y10T 156/1064* (2015.01)

(56) References Cited

U.S. PATENT DOCUMENTS

| 3,352,190 | A | * | 11/1967 | Carlson | F16B 23/003 411/386 |
| 3,455,198 | A | * | 7/1969 | Barrett | F16B 5/0275 411/107 |
| 3,897,713 | A | * | 8/1975 | Gugle | F16B 5/0275 156/303.1 |
| 4,157,674 | A | * | 6/1979 | Carlson | F16B 5/0275 411/324 |
| 4,223,585 | A | * | 9/1980 | Barth | F16B 23/0076 411/386 |
| 4,304,503 | A | * | 12/1981 | Gehring | F16B 35/04 29/525.04 |
| 4,334,815 | A | * | 6/1982 | Knohl | F16B 35/007 411/368 |
| 4,536,524 | A | * | 8/1985 | Hart | C08G 59/18 156/330 |
| 4,907,928 | A | * | 3/1990 | Beck | F16B 19/14 411/356 |
| 5,154,610 | A | * | 10/1992 | Gregorio Gracia | A61C 9/002 411/388 |
| 5,536,344 | A | * | 7/1996 | van Dreumel | B29C 65/0672 156/257 |
| 6,491,487 | B1 | * | 12/2002 | Wojciechowski | B23P 19/062 29/432.2 |
| 6,592,311 | B2 | * | 7/2003 | Wojciechowski | B23P 19/062 411/107 |
| 7,004,699 | B2 | * | 2/2006 | Petrok | F16B 5/02 411/366.1 |
| 8,602,704 | B2 | | 12/2013 | Babej et al. | |
| 8,641,343 | B2 | * | 2/2014 | Mitrovic | F16B 5/0275 411/338 |
| 8,905,697 | B2 | * | 12/2014 | Gong | E04D 3/3606 411/371.1 |
| 2007/0053766 | A1 | * | 3/2007 | Lin | E06B 3/9636 411/389 |

* cited by examiner

ADHESIVE BOLT AND ATTACHMENT METHOD

CROSS REFERENCE TO RELATED APPLICATION

This application claims priority under 35 USC 119 to German Patent Appl. No. 10 2013 113 763.6 filed on Dec. 10, 2013, the entire disclosure of which is incorporated herein by reference.

BACKGROUND

1. Field of the Invention

The invention relates to an adhesive bolt for use in a motor vehicle, and more precisely to a bolt for adhesively bonding to a component to fasten a device such as a hose or a wiring harness to the component.

2. Description of the Related Art

An adhesive bolt can be used as an anchor point to fasten a device, such as a hose or a cable, to a motor vehicle. For example, an adhesive bolt from Emhart-Tucker Inc. has a head, a shank and a meltable adhesive applied in the region of the shank. The bolt can be heated inductively until the adhesive melts. The shank of the adhesive bolt then is introduced into a cutout on a component and is held fixedly there until the adhesive has cooled sufficiently to solidify. The cooling can entail waiting times in the range of approximately 20 seconds. Thus, an automated attachment of bolts of this type, for example by a multiple-axis robot, is not efficient in some circumstances.

WO 2006/032954 A1 discloses an apparatus and a method for attaching an anchor element to a surface of a workpiece.

The invention is based on the object of providing an adhesive bolt and a method for attaching the adhesive bolt to provide a simple and flexible connecting option, in particular for automotive engineering.

SUMMARY OF THE INVENTION

An adhesive bolt according to the invention provides a fastening or anchor point to a workpiece. More particularly, the adhesive bolt comprises a head and a shank that is connected to the head. The shank is configured to be introduced into a cutout on the workpiece, and an adhesive is situated in the region of the shank and the workpiece. The shank is configured to enter into a non-positive preliminary connection with a bounding face of the cutout until the adhesive has hardened.

There is no need to wait until the adhesive has hardened after placing the bolt. Rather a person or an apparatus engaged in the placing of bolts can immediately place a further bolt at a different location on the same workpiece. Thus, both manual and automated attachment of the bolts on the workpiece can be accelerated. The combination of the non-positive preliminary connection and the adhesive bond achieves a relatively low load-bearing capability of the preliminary connection that is sufficient to hold the adhesive bolt to the workpiece until the adhesive has hardened. The higher load-bearing capability of the adhesive after hardening can permit solid fastening of an element to the workpiece. The non-positive connection can be produced in different variants, for example, by means of a positively locking connection or frictional connection.

In a first variant, the shank has a knurled portion. The knurled portion comprises depressions that extend radially with respect to a longitudinal axis of the shank and run along the shank in a straight or helical manner. Any desired type of knurling can be used, such as cross knurling. The knurled portion can permit a simple and efficient non-positive preliminary connection of the shank to the workpiece. To this end, the shank can be pushed or screwed into the cutout on the workpiece.

In another variant, the shank has a predefined oversize with regard to the cutout. The oversize can be defined precisely so that a clamping force between the shank and the workpiece can be defined satisfactorily. Rotating the adhesive bolt during the attachment can be unnecessary.

In yet a further variant, the shank has a thread. As a result, the adhesive bolt can be screwed into the workpiece in the manner of a screw connection. A tightening moment can be monitored to control the strength of the screw connection. Moreover, threads of different fineness or lead are possible and optionally can engage radially into the material of the workpiece to different depths. In one embodiment, a multiplicity of thread turns with the lead 0 is provided. This results in grooving so that the bolt can be pushed in instead of being screwed in.

In one embodiment, the thread has self-tapping flanks. This embodiment can be used advantageously in the case of a relatively coarse thread, preferably with thread turns that protrude radially to a relatively great extent. A thread of this type is known for instance from a sheet metal screw.

The stated variants can be combined with one another. In particular, the knurled portion or the thread can be combined with the oversize to permit preliminary fastening of the adhesive bolt to the workpiece. This fastening is as secure as possible and saves material.

In a further embodiment, the shank has a tool geometry at its end remote from the head to form the cutout on the workpiece when the tool geometry is pressed against the workpiece and the adhesive bolt is rotated about its longitudinal axis. In other words, the adhesive bolt can be equipped with a dedicated drilling or milling cutter to prepare the cutout. The preparation of the workpiece in the region in which the adhesive bolt is to be attached can then be less complicated or even superfluous. For example, it can be sufficient to provide a pilot hole, a punch mark or an indentation in the region of the attachment before the adhesive bolt is used in a combined work operation for preparing and finishing the cutout as the shank is introduced into the cutout.

In a further embodiment, the head comprises a tool geometry on a side that faces the workpiece to roughen a surface of the workpiece when the tool geometry is pressed against the workpiece and the adhesive bolt is rotated about its longitudinal axis. As a result, the adhesive can enter into an improved bond with the workpiece and/or with the tool geometry to increase the load-bearing capability of the adhesive bond. This embodiment can be combined with the last-mentioned embodiment so that the adhesive bolt has two tool geometries.

A micro-encapsulated adhesive may be provided in the region of the head or the shank. The adhesive can be activated by pressing the head of the adhesive bolt against the surface of the workpiece after the shank has been introduced into the cutout. Separate handling of adhesive can then be dispensed with during the attachment.

A method according to the invention for attaching an adhesive bolt to a workpiece may comprise providing a workpiece with a cutout, providing an adhesive bolt, applying an adhesive to the adhesive bolt and/or the workpiece in the region of the cutout, and introducing the shank of the adhesive bolt into the cutout. The adhesive bolt can be attached rapidly and reliably to the workpiece, and a person or an apparatus for placing adhesive bolts does not have to hold the adhesive bolt until the adhesive has set. The attachment of adhesive bolts to the workpiece can thus take place more rapidly.

The adhesive bolt may be relieved after introduction into the cutout until the adhesive has set. The adhesive bolt should not be loaded completely during the setting by way of an object that is to be attached to the workpiece. However, it is not necessary to additionally fix the adhesive bolt during the hardening of the adhesive, for example by way of a gripping or clamping apparatus.

The cutout may be provided on the workpiece by a step drill that has a first section with a first diameter for producing the cutout and a second section with a second, greater diameter, the end face of the second section may be set up to roughen the workpiece in a region about the cutout. As a result, drilling of the cutout and roughening of the surface of the workpiece can be carried out in a single work operation. As a result, a tool change between separate work operations can be dispensed with, and time can be saved during assembly. Moreover, the problem of finding the same location again after a tool change can be dispensed with.

A quantity of applied adhesive is dimensioned depending on a surface roughness or a curvature of the workpiece in the region of the cutout. Excessive adhesive or adhesive that has been metered in too small a quantity can thus be avoided. As a result, the strength of the bond can be improved and costs can be saved.

The adhesive can be metered individually depending on the surface roughness and/or curvature. Thus, for example in the case of a spherically curved component, in particular a vehicle body component made from carbon fiber or glass fiber reinforced plastic, mounting of the bolt is possible both on a smooth outer surface and on a rough inner surface ("unmold face"). In both cases, a curvature of the workpiece at the head can be concave or convex.

DETAILED DESCRIPTION

Figure 1:
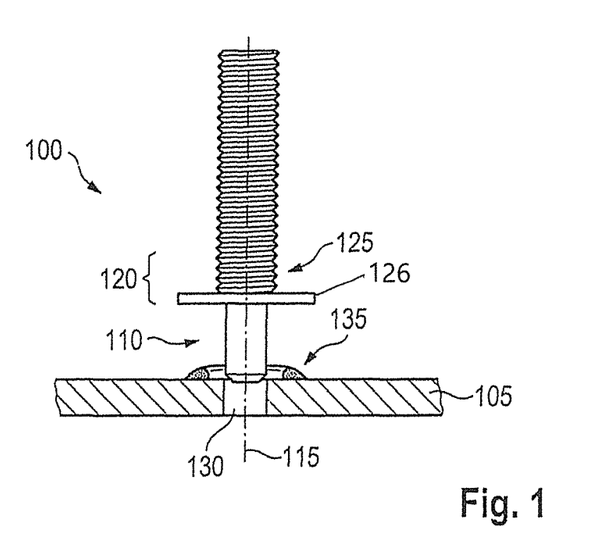
FIG. 1 is a side elevational view of an adhesive bolt.

FIG. 1 shows an adhesive bolt 100 on a workpiece 105. The workpiece can be, in particular, a thin-walled element, as used in vehicle engineering for a body or another vehicle part. The workpiece can comprise, for example, a metal sheet, a plastic, glass fiber reinforced plastic (GRP) or carbon fiber reinforced plastic (CRP).

The adhesive bolt 100 comprises a shank 110 that extends along a longitudinal axis 115 and a head 120 that is connected to one end of the shank 110. The head 120 has a greater diameter than the shank 110 and preferably is configured to be rotationally symmetrical with respect to the longitudinal axis 115, in particular round. The head 120 of the bolt 100 shown in FIG. 1 comprises a fastening element 125 in the form of a threaded body and a flange 126 at the end of the head 120 adjacent the shank 110. The flange 126 projects radially out farther than the fastening element 125 or the shank 110. The fastening element 125 enables an object to be attached to the workpiece 105 after the adhesive bolt 100 has been fastened completely to the workpiece 105. For example, the fastening element 125 can be set up for connection to a hose, a cable or another element. The fastening element 125 can be configured differently to that shown, and for example can be a latching connection with a cutout for receiving a cable tie or another anchoring device. The head 120, including threaded body that defines the fastening element 125 usually extends longer than the shank 110 in the axial direction. The length ratio of the head 120 to the shank 110 may be approximately 3:1. For example, the head 120 can be approximately 15 mm long, whereas the shank 110 is approximately 5 mm long.

The head 120 preferably has one or more bearing faces for engaging a tool when placing the adhesive bolt 100 on the workpiece 105. Thus, bearing faces can be provided for holding and/or rotating the adhesive bolt 100 about its longitudinal axis 115. The adhesive bolt 100 may be made from a uniform material, such as steel or plastic.

The workpiece 105 may have a cutout 130 for receiving the shank 110 of the adhesive bolt 100. The workpiece 105 can be a thin-walled component. In a different manner to that shown, the workpiece 105 can have different roughnesses on the upper side and the underside. In addition, the workpiece 105 can also be bent concavely or convexly in the region of the cutout 130.

Adhesive 135 can be introduced into a region between the workpiece 105 and the flange 126 of the head 120 before the shank 110 is introduced completely into the cutout 130. The adhesive 135 can comprise, for example, a single-component or two-component adhesive, for instance an epoxy resin, acrylate or other basis. A meltable adhesive 135 that gains strength after cooling also can be provided. The adhesive 135 preferably is selected and optionally metered depending on the materials of the workpiece 105 and the adhesive bolt 100.

The shank 110 may be designed so that a preliminary connection results between the shank 110 and bounding faces of the cutout 130 after introducing the adhesive bolt 100 on the workpiece 105. This preliminary connection can be loaded sufficiently to hold the adhesive bolt 100 on the workpiece 105 until the adhesive 135 has set or hardened. To this end, various embodiments will be described in the following text with reference to FIGS. 2 to 6, the features of which embodiments can be combined with one another.

Figure 2:
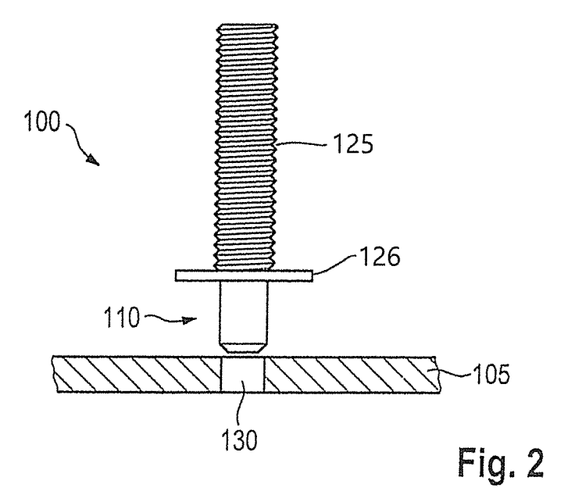
FIGS. 2-9 are side elevational views of alternate adhesive bolts.

FIG. 2 shows an embodiment of the adhesive bolt 100 with a locating connection between the shank 110 and the workpiece 105. To this end, an external diameter of the shank 110 has a predefined oversize with regard to an internal diameter of the cutout 130. Thus, pushing the shank 110 into the cutout 130 produces a loading connection with a radial clamping force that holds the adhesive bolt 100 on the workpiece 105 until the adhesive bond has hardened.

Figure 3:
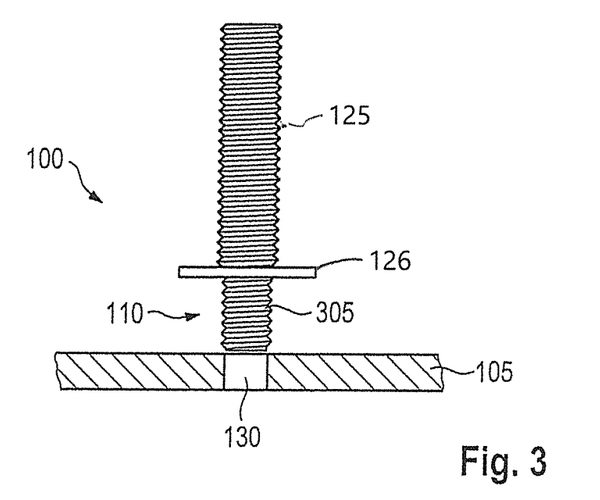

FIG. 3 shows an embodiment with a thread 305 on the shank 110 of the adhesive bolt 100. Flanks of the thread 305 preferably extend radially to the outside from the shank 110. In one embodiment, the flanks of the thread 305 are set up to cut furrows into the workpiece 105 while screwing the adhesive bolt 100 into the cutout 130 of the workpiece 105 so that a screw connection is produced. In another embodiment, a suitable thread is provided on the workpiece 105 in the region of the cutout 130.

Figure 4:
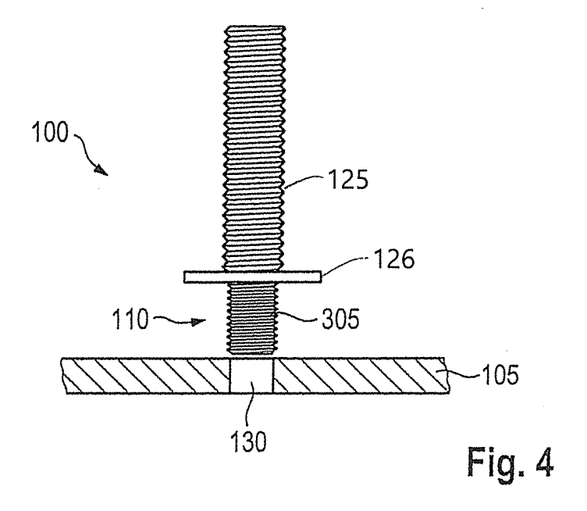

FIG. 4 shows a fine or very fine thread 305 on the shank 110 of the adhesive bolt 100. The fine thread or very fine thread may be used in conjunction with the abovementioned separate introduction of a thread in the region of the cutout 130.

Figure 5:
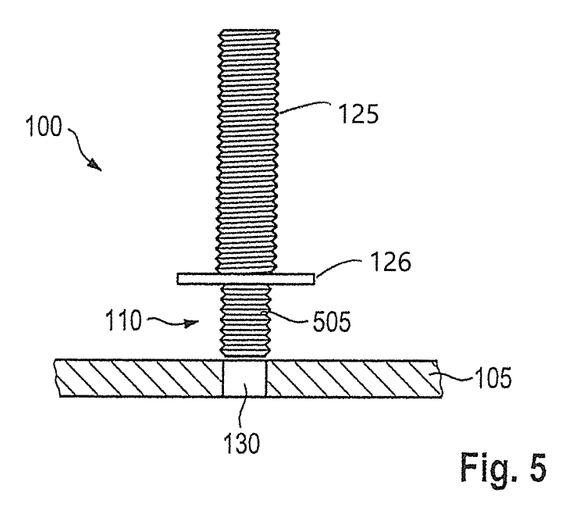

FIG. 5 shows the adhesive bolt 100 where the flanks of the thread 305 do not have any lead at all, and can be called a grooving 505. In this embodiment, the adhesive bolt 100 preferably is not screwed into the cutout 130, but rather is pressed in, pushed in or hit in. The grooving 505 can be configured in the form of barbs. Moreover, the grooving 505 can have flanks configured to be deformed axially during the introduction of the shank 110 into the cutout 130 so that there can be a barb effect.

Figure 6:
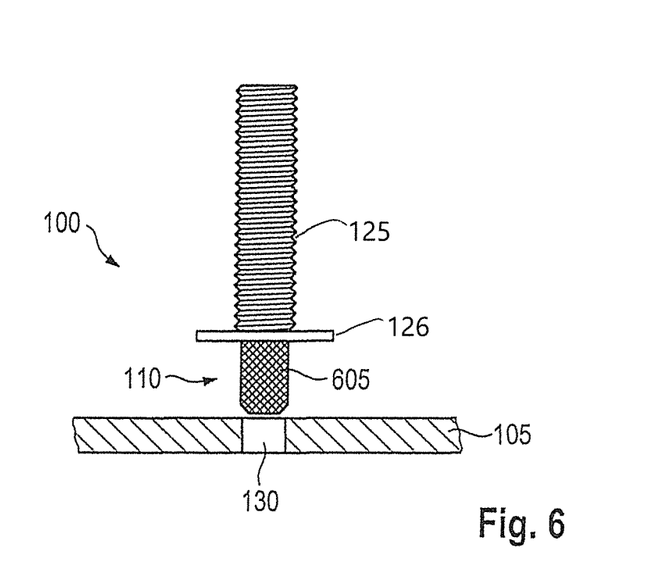

FIG. 6 shows an embodiment of the adhesive bolt 100 in which the shank 110 bears a knurled portion 605. Customary variants of knurled portions 605 may be suitable, such as those shown in German DIN 82.

Figure 7:
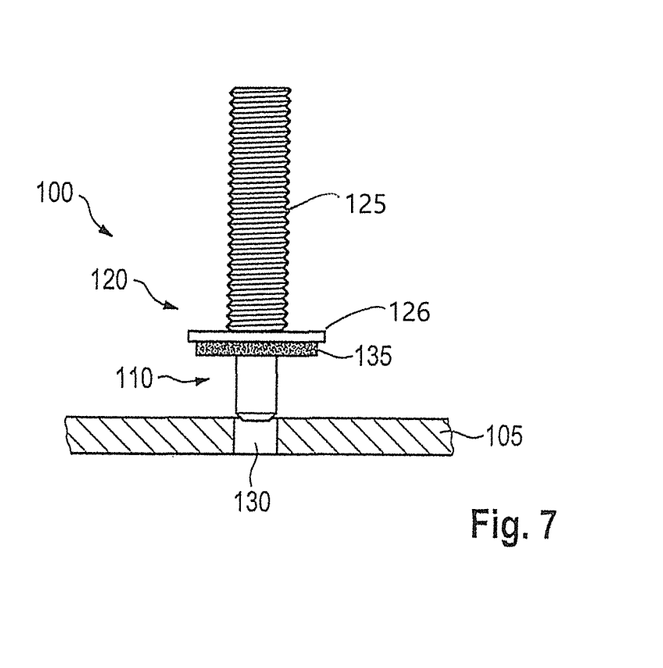

FIG. 7 shows an embodiment in which the adhesive 135 is applied in the region of the flange 126 of the head 120 of the adhesive bolt 100 facing the shank 110. Thus, separate feeding, metering or application of the adhesive 135 into a region between the head 120 and the surface of the workpiece 105 before the shank 110 is introduced completely into the cutout 130 can be dispensed with. The micro-encapsulated adhesive 135 can contain small capsules that break open upon mechanical loading or under pressure, and release a substance that hardens.

Figure 8:
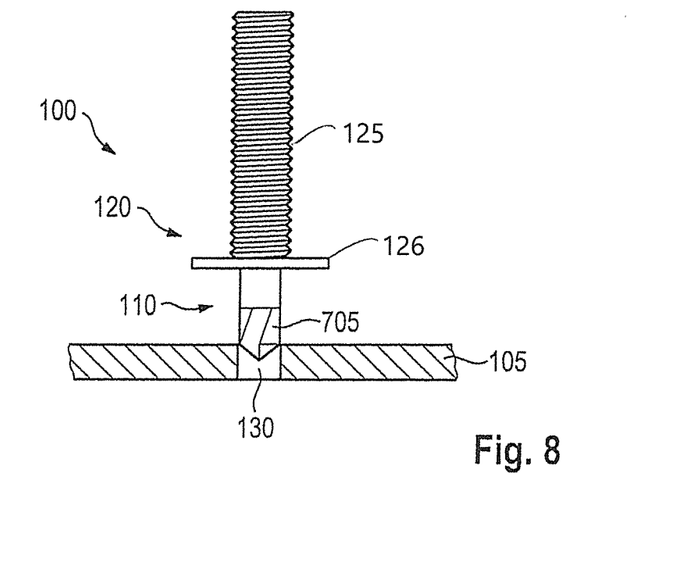

FIG. 8 shows an embodiment of the adhesive bolt 100 with a first tool geometry 705 arranged at an axial end of the shank 110 on a side that faces away from the flange 126 of the head 120. The tool geometry 705 can be used for drilling or milling the cutout 130 before or while the shank 110 is introduced into the cutout 130.

Figure 9:
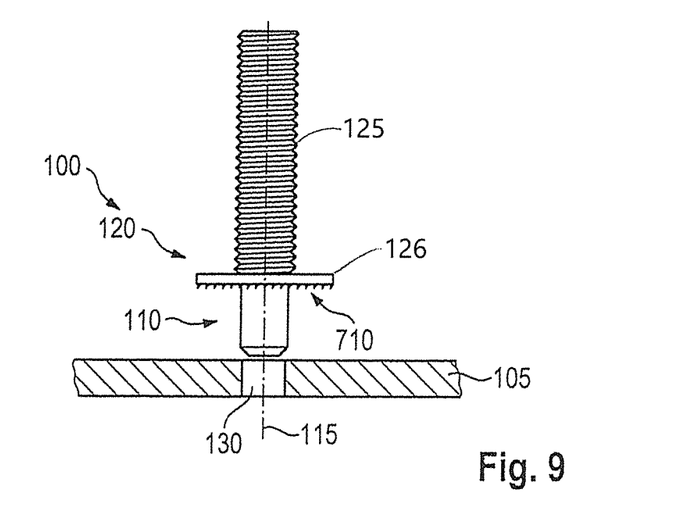

FIG. 9 shows an embodiment of the adhesive bolt 100 with a second tool geometry 710 in a region of a bearing face of the head 120 that faces the workpiece 105. The second tool geometry 710 can be set up for roughening the surface of the workpiece 105 when the adhesive bolt 100 is rotated about its longitudinal axis 115 and the second tool geometry 710 is pressed against the surface of the workpiece 105.

The abovementioned embodiments can be combined with one another. In particular, the variants shown in FIGS. 2 to 6 for the preliminary fastening of the adhesive bolt 100 to the workpiece 105 can be combined with the micro-encapsulated adhesive of FIG. 7 and the tool geometries 705, 710 of FIGS. 8 and 9.

Figure 10:
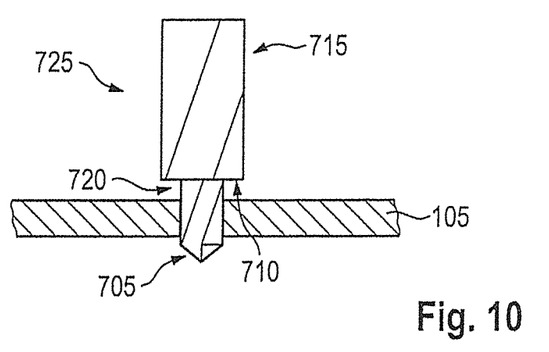
FIG. 10 is a side elevational view of a step drill for preparing a workpiece for the attachment of an adhesive bolt.

Instead of the tool geometries 705 and 710 on the adhesive bolt 100, a step drill 715 can be used to perform the stated machining steps on the workpiece 105 before the adhesive bolt 100 is bonded adhesively. To this end, the step drill 715 comprises a first section 720 with a first diameter and a second section 725 with a second, greater diameter. The first tool geometry 705 lies on an end of the first section 720 and the second tool geometry 710 lies on an end of the second section 725.

Figure 11:
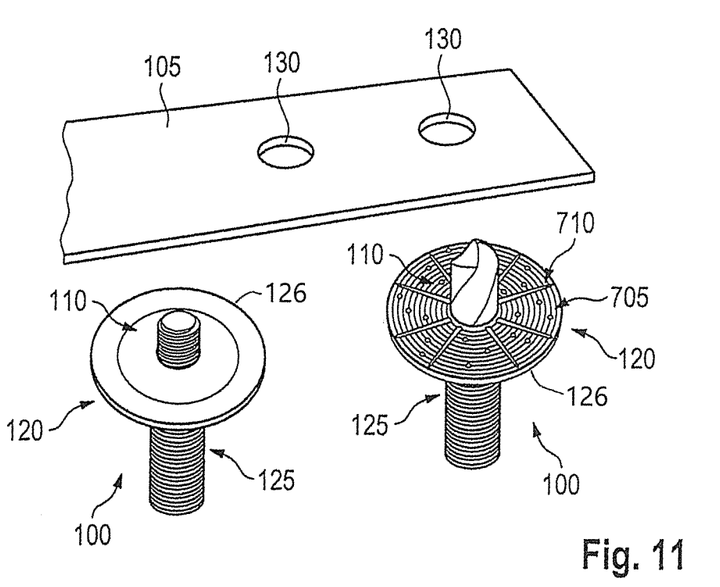
FIG. 11 is an exploded perspective view showing two exemplary adhesive bolts.

FIG. 11 shows views of exemplary adhesive bolts 100 for use on a workpiece 105. Both adhesive bolts 100 bear a fine thread according to FIG. 4 or a grooving according to FIG. 5. The adhesive bolt 100 shown on the right side bears a first tool geometry 705 and a second tool geometry 710.

Figure 12:
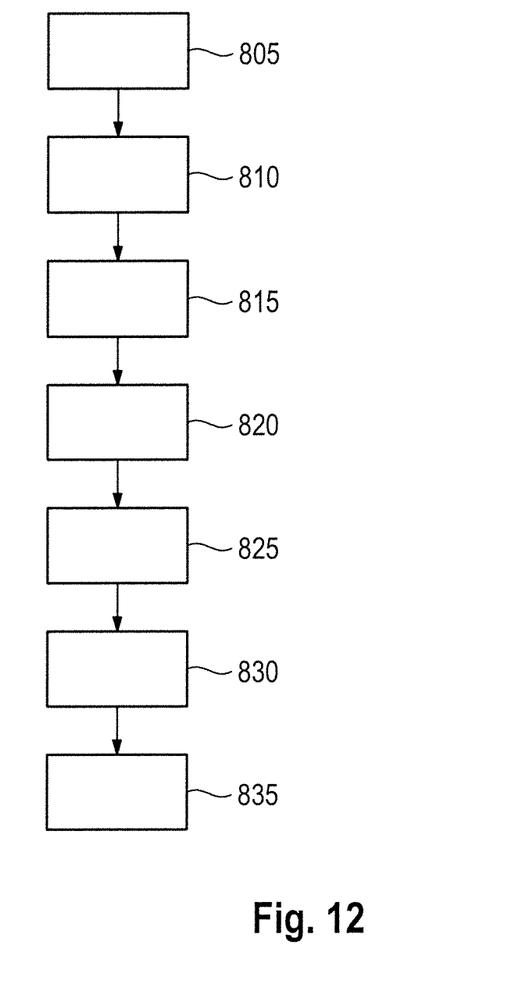
FIG. 12 is a flow diagram of a method for attaching an adhesive bolt to a workpiece.

FIG. 12 shows a flow diagram of a method 800 for attaching an adhesive bolt 100 to the workpiece 105. The method 800 is set up, in particular, for being carried out by a machine tool, for example a five-axis CNC machine. To this end, a robot arm can be equipped with a changing apparatus that comprises different tools and a feed device for adhesive bolts 100. The changing apparatus can be, in particular, of the revolver type.

In a first step 805, the workpiece 105 and the adhesive bolt 100 are provided. In step 810, the cutout 130 is made. This can take place by a drill, the step drill 715 or the first tool geometry 705 of the adhesive bolt 100. In one embodiment, the region of the cutout 130 subsequently or simultaneously is kept clean or cleaned by an extraction means or suction jets.

The drill, the step drill 715 or the adhesive bolt 100 may be removed partially or completely after finishing the cutout 130 to clean or to degrease the drilling location. At least partial removal of the tool may be a precondition for the step 820, in which the adhesive 135 is applied. If the adhesive 135 already is applied to the adhesive bolt 100 in a manner metered to the final quantity, as explained above in relation to FIG. 7, step 820 can be dispensed with, and, if no cleaning or degreasing is required, step 815 can also be dispensed with. Otherwise, the adhesive 135 can be metered and applied by a corresponding apparatus. The metering can take place depending on a surface condition and/or a curvature of the workpiece 105 in the region of the cutout 130.

In step 825, the adhesive bolt 100 is inserted into the cutout 130 until contact with a predefined force to distribute the adhesive between the workpiece 105 and the bearing side of the head 120 and to produce a preliminary non-positive connection between the shank 110 and the workpiece 105, as described more precisely above. The placing can comprise pressing in, pushing in, hitting in or screwing in.

Subsequently, in step 830, the adhesive bolt 100 can be relieved, in particular a gripping tool of the CNC device can release the adhesive bolt 100 and is immediately available for a further task. It is preferred that the adhesive bolt 100 is not loaded further until the adhesive 135 has set completely in step 835. Afterward, a device or an object can be attached to the anchor point of the adhesive bolt 100 which has been produced.

What is claimed is:

1. An adhesive bolt for forming a fastening point to a workpiece, the adhesive bolt comprising:
   a head having a threaded body with a leading end and a flange projecting out from an end of the threaded body remote from the leading end, a surface of the flange facing away from the body being aligned perpendicular to an axis of the head and having a tool geometry disposed at plural spaced apart positions inward of an outer periphery of the flange and configured for roughening a surface of the workpiece;
   a shank connected to the head and extending from the surface of the flange facing away from the body, the shank being configured to be introduced into a cutout on the workpiece; and
   an adhesive situated in a region of the surface of the flange facing away from the body of the head and adjacent to the shank and the workpiece, wherein
   the shank is configured to enter into a non-positive preliminary connection with a bounding face of the cutout until the adhesive has hardened.

2. The adhesive bolt of claim 1, wherein the shank has a non-threaded knurled portion.

3. The adhesive bolt of claim 1, wherein the shank has a predefined oversize with regard to the cutout.

4. The adhesive bolt of claim 1, wherein the shank has a thread.

5. The adhesive bolt of claim 4, wherein the thread has self-tapping flanks.

6. The adhesive bolt of claim 1, wherein the shank has drill at an end of the shank that is remote from the flange to form the cutout in the workpiece when the end of the shank is pressed against the workpiece and the adhesive bolt is rotated about its longitudinal axis.

7. The adhesive bolt of claim 1, wherein the tool geometry on the side of the flange that faces the workpiece includes radially aligned ribs extending radially out from the shank and roughened regions between the radially aligned ribs to roughen a surface of the workpiece when the tool geometry is pressed against the workpiece and the adhesive bolt is rotated about its longitudinal axis.

8. The adhesive bolt of claim 1, wherein the adhesive is a micro-encapsulated adhesive provided in a region of the head and being activated by pressing together.

9. A method for attaching an adhesive bolt to a workpiece, comprising:
   providing a workpiece with a cutout;
   providing the adhesive bolt;
   applying an adhesive to the adhesive bolt and/or the workpiece (105) in the region of the cutout, and
   introducing the shank of the adhesive bolt into the cutout.

10. The method claim 9, further comprising releasing the adhesive bolt after the introduction into the cutout and before the adhesive has set.

11. The method of claim 10, the cutout is provided on the workpiece by a step drill with a first section having a first diameter for producing the cutout and a second section with a second, greater diameter, the end face of the second section being configured to roughen the workpiece in a region about the cutout.

12. The method of claim 9, wherein a quantity of applied adhesive is dimensioned depending on a surface roughness or a curvature of the workpiece in the region of the cutout.

13. An adhesive bolt for forming a fastening point to a workpiece, the adhesive bolt comprising:
   a head having a threaded body with a leading end and a flange projecting out from an end of the threaded body remote from the leading end;
   a shank connected to the head and extending from the surface of the flange facing away from the threaded body, the shank defining a stepped shape with a small diameter portion remote from the flange and a large diameter portion between the small diameter portion and the flange, the large and small diameter portions being configured as drills so that the shank defines a stepped drill for forming a cutout in the workpiece; and
   an adhesive situated in a region of the surface of the flange facing away from the threaded body of the head and adjacent to the shank and the workpiece, wherein
   the shank being is configured to enter into a non-positive preliminary connection with a bounding face of the cutout formed by the drills until the adhesive has hardened.

* * * * *